(12) United States Patent
Walker et al.

(10) Patent No.: US 8,995,948 B2
(45) Date of Patent: Mar. 31, 2015

(54) EMERGENCY CALL FORWARD BASED ON LOCATION

(75) Inventors: David Ryan Walker, Waterloo (CA); Jerome Pasquero, Montreal (CA); Donald Somerset McCulloch McKenzie, Waterloo (CA)

(73) Assignee: BlackBerry Limited, Waterloo (CA)

( * ) Notice: Subject to any disclaimer, the term of this patent is extended or adjusted under 35 U.S.C. 154(b) by 40 days.

(21) Appl. No.: 13/599,230

(22) Filed: Aug. 30, 2012

(65) Prior Publication Data

US 2014/0065997 A1  Mar. 6, 2014

(51) Int. Cl.
*H04W 88/02* (2009.01)
*H04W 4/16* (2009.01)
*H04W 4/02* (2009.01)
*H04W 4/22* (2009.01)

(52) U.S. Cl.
CPC ........ *H04W 4/16* (2013.01); *H04W 4/02* (2013.01); *H04W 4/22* (2013.01)
USPC ........................................................ 455/404.1

(58) Field of Classification Search
USPC ............... 455/417, 466, 41.1, 423, 418, 445, 455/456.1; 379/201.6; 370/250
See application file for complete search history.

(56) References Cited

U.S. PATENT DOCUMENTS

| 2003/0112952 | A1* | 6/2003 | Brown et al. ............ 379/211.01 |
|---|---|---|---|
| 2008/0205608 | A1* | 8/2008 | Tal et al. .................... 379/93.01 |
| 2009/0280817 | A1 | 11/2009 | Chavez et al. |
| 2012/0035924 | A1* | 2/2012 | Jitkoff et al. .................. 704/235 |
| 2012/0105475 | A1* | 5/2012 | Tseng ............................ 345/633 |
| 2012/0214449 | A1 | 8/2012 | Jordan et al. |

OTHER PUBLICATIONS

European Search Report dated Jan. 16, 2013 from corresponding EP application 12182340.5.

* cited by examiner

*Primary Examiner* — Diane Mizrahi
(74) *Attorney, Agent, or Firm* — Moffat & Co.

(57) ABSTRACT

A location-based call forwarding method comprises, in response to determining that an intended call recipient is unavailable to receive a call from a caller, identifying an alternate call recipient located within a predetermined proximity of a current location of the intended call recipient, and forwarding the call to the alternate call recipient. The alternate call recipient may be identified by determining a person with whom the intended recipient is meeting or an establishment where the intended recipient is situated. This information may be extracted from various sources such as a calendar, social network site, or device-generated location data.

14 Claims, 14 Drawing Sheets

EMERGENCY CALL FORWARD BASED ON LOCATION

CROSS-REFERENCE TO RELATED APPLICATIONS

This is the first application filed for the present technology.

TECHNICAL FIELD

The present technology relates generally to mobile devices and, in particular, to location-based call forwarding techniques for mobile devices.

BACKGROUND

Mobile devices or wireless communications device are ubiquitous. Because so many people now carry mobile devices with them at all times, at least when away from home, it is often assumed that a mobile subscriber can always be reached by simply calling the number associated with the mobile device. However, the mobile subscriber may be unavailable due to any one of a number of reasons—the device may be shut off, the battery may be drained, there may be no wireless coverage, the ringer may be off, etc. In such instances, it may not be possible to reach the mobile subscriber, which may be highly problematic, especially in emergency situations.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
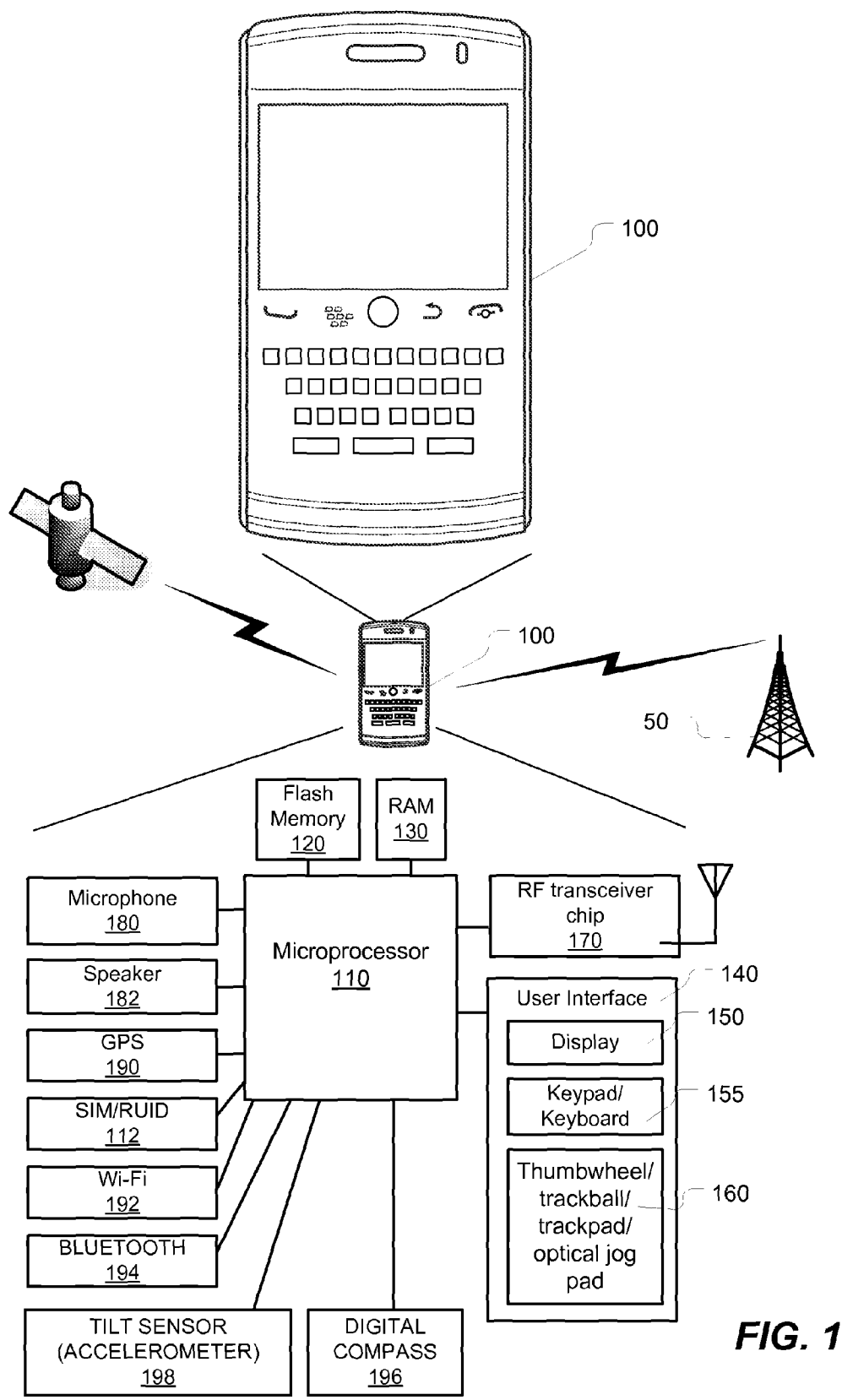
FIG. 1 is a depiction of a mobile device on which the present technology may be implemented, the depiction including a schematic depiction of some components of the mobile device.

The present technology provides a call forwarding technique for forwarding a telephone call to an alternate call recipient who is in close proximity to the intended call recipient when the latter is unable to receive a call. The call may be forwarded to a person or establishment that is near the intended, but unavailable, call recipient. This technology enables a mobile device user or mobile subscriber (the intended call recipient) to be contacted indirectly, i.e. advised by the alternate call recipient to whom the call is forwarded that the caller urgently wishes to speak to the intended call recipient. As will be elaborated below, this enables the caller to reach a person with whom the intended call recipient is meeting, visiting, traveling, working, playing, etc., or, alternatively, to contact an establishment (e.g. restaurant, café, hotel, gym, workplace, etc. or even another person's residence or home) where the intended call recipient is located.

Accordingly, one aspect of the present technology is a computer-implemented method for forwarding a call based on location. This method of location-based call forwarding comprises, in response to determining that an intended call recipient is unavailable to receive a call from a caller, identifying an alternate call recipient located within a predetermined proximity of a current location of the intended call recipient and then forwarding the call to the alternate call recipient.

Another aspect of the present technology is a computer-readable medium comprising instructions in code which when loaded into a memory and executed by a processor of a wireless communications device cause the device to, in response to determining that an intended call recipient is unavailable to receive a call from a caller, identify an alternate call recipient located within a predetermined proximity of a current location of the intended call recipient and then forward the call to the alternate call recipient.

Another aspect of the present technology is a wireless communications device having a user interface for receiving user input to initiate a call to an intended call recipient, a radiofrequency transceiver for transmitting call setup signalling data for initiating the call with the intended call recipient, and a memory coupled to a processor for, in response to receiving a message that the intended call recipient is unavailable, presenting a notification to the caller that the call is being forwarded automatically to an alternate call recipient located within a predetermined proximity of a current location of the intended call recipient.

Yet another aspect of the present technology is a call-management server comprising a communication port for receiving call setup signalling data from a device associated with a caller for initiating a call with an intended call recipient. The server further includes a memory coupled to a processor for determining that the intended call recipient is unavailable and for, in response to receiving a signal that the intended call recipient is unavailable, automatically determining an alternate call recipient located within a predetermined proximity of a current location of the intended call recipient, and for automatically forwarding the call to the alternate call recipient.

Yet a further aspect of the present technology is a computer-implemented method of call forwarding. The method entails, in response to determining that an intended call recipient is unavailable to receive a call from a caller via a first phone number, determining if the intended call recipient has a secondary phone number. In response to determining that the intended call recipient is unavailable to receive the call via the secondary phone number, the method then entails identifying an alternate call recipient proximate to the intended call recipient and forwarding the call to the alternate call recipient.

The details and particulars of these aspects of the technology will now be described below, by way of example, with reference to the drawings.

FIG. 1 is a depiction of a wireless communications device as one example of a mobile device that may be used to implement this novel location-based call-forwarding technique. Examples of a mobile device or wireless communications device include cell phones, smart phones, mobile phones, portable digital assistants, or any other such portable or handheld electronic communications devices.

As shown by way of example in FIG. 1, the mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications and, in this instance, for receiving user input to set up a call to another device. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the mobile device 100 may include a wireless transceiver 170 for communicating with other devices. The transceiver 170 may be a radiofrequency (RF) transceiver for wirelessly communicating with one or more base stations 50 over a cellular wireless network using cellular communication protocols and standards for both voice calls and packet data transfer such as GSM, CDMA, GPRS, EDGE, UMTS, LTE, etc. Where the computing device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may optionally include one or more ports or sockets for wired connections, e.g. USB, HDMI, FireWire (IEEE 1394), etc. or for receiving non-volatile memory cards, e.g. SD (Secure Digital) card, miniSD card or microSD card.

For voice calls, the mobile device 100 includes a microphone 180, a speaker 182 and/or an earphone jack. Optionally, the device may include a speech-recognition subsystem for transforming voice input in the form of sound waves into an electrical signal. The electrical signal is then processed by a speech-recognition module (digital signal processor) to determine voice commands from the voice input. Voice commands may be used to initiate a call and to select the call recipient from an address book.

Optionally, the mobile device 100 includes a positioning subsystem such as a Global Positioning System (GPS) receiver 190 (e.g. in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system.

Optionally, the mobile device 100 may include a Wi-Fi™ transceiver 192, a Bluetooth® transceiver 194, and/or a near-field communications (NFC) chip. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or a tilt sensor or accelerometer 198.

As noted above, the wireless communications device depicted in FIG. 1 is only one example of a mobile device 100 on which the present technology may be implemented. Other mobile devices 100 may include laptops, notebooks, palmtops, tablets, personal digitals assistants, or any other device capable of voice communications. The voice communication (i.e. the "call") may be made using any landline or mobile telephony or signalling protocols known in the art, e.g. GSM, LTE, etc., PSTN, ISDN, ISUP, POTS, SS7 (CCSS7 or C7). The call may also be a voice over IP (VoIP) call.

The novel wireless communications device (or mobile device) 100 is thus configured to enable a caller to initiate a call to an intended call recipient and to then receive a message from a call-management server 200 handling the call that the intended call recipient is unavailable. In response to receiving this message, the mobile device in one embodiment presents to the caller an indication that the intended call recipient is unavailable and that the call is being automatically forwarded to an alternate call recipient which has been determined by the call-management server. In another embodiment, the device (or the call-management server via the device) may solicit input from the caller to select whether to forward the call to an alternate call recipient. This may be in the form of a prompt such as "Forward Call to Alternate Call Recipient?", requesting user input before proceeding to forward the call. If the caller replies in the affirmative, the call is forwarded to the alternate call recipient. If the caller replies in the negative, the call is not forwarded. In this latter instance, the device may be configured to (i) return to a phone screen to enable the caller to try another number; (ii) suggest or propose a secondary number for the intended call recipient, e.g. from the address book, or (iii) automatically forward the call to a secondary number associated with the intended call recipient. A secondary number, for the purposes of this specification, may be a second telephone number associated with a specific device or it may be a separate device e.g. a second mobile device, associated with the intended call recipient. In another embodiment, rather than prompting or querying the user as to whether to not to forward the call, the device may be configured to automatically call any secondary number or secondary device associated with the intended call recipient before forwarding the call to the alternate call recipient.

Initially, the mobile device 100 receives user input via the user interface 140 to attempt to set up a call with an intended call recipient. This may involve inputting a telephone number, selecting a contact stored in an address book, or selecting a name or number from a list of recently dialed numbers or from a list of missed or received calls. Other call initiation techniques may be employed such as voice commands, clicking on hyperlinked phone numbers, speed dial buttons, redial command, etc.

The radiofrequency (RF) transceiver 170 transmits call setup signalling data to the call-management server 200 to initiate, or attempt to initiate, the call with the intended call recipient. As is known in the art, the mobile device, assuming its already attached to the mobile network and the call-management server, transmits a call setup request message to the wireless network via the nearest wireless base station 50 which passes the call setup request message to a Mobile Switching Center (MSC) which may be one embodiment of a call-management server 200. If the device is roaming, the Visitor Location Register (VLR) queries the Home Location Register (HLR) which stores the SIM record (subscriber data) for the device that enables the VLR to determine what services the device is entitled to use. Call setup, roaming, and the actual forwarding of the call would thus be implemented in accordance with these established protocols.

If the call is answered, the caller may deliver his urgent message to the intended call recipient. If, however, the intended call recipient is unavailable, the call is then forwarded to an alternate call recipient determined to be near the intended call recipient. In the case where the intended call recipient is unavailable, the call-management server 200 receives a signal from the device associated with the intended call recipient or from the mobile carrier network to indicate that the intended call recipient is unavailable. This may be a signal that the mobile subscriber's handset is off or outside of wireless range. This may also be a signal that the line is busy, that the call went to voice mail, that the call has rung more than a predetermined number of times without being answered, or any other such indication.

In response to this signal indicating the recipient's unavailability, the memory and processor of the call-management server 200 (or any other computing device tasked with this function) cooperate to automatically determine an alternate call recipient located within a predetermined proximity of a current location of the intended call recipient. Techniques for identifying this alternate call recipient will be described below in detail. Once this alternate call recipient has been identified, the memory and processor of the call-management server 200 cooperate with a communication port of the server to automatically forward the call to the alternate call recipient. If the alternate call recipient is unavailable, the server 200 may be configured to seek to identify a further alternate call recipient. In one embodiment, the server 200 may forward the call to a sequence of alternate call recipients, cycling back to the intended call recipient after having tried a number of alternate recipients.

In one embodiment, the mobile device 100 presents (i.e. displays and/or speaks) a notification that the intended call recipient is unavailable and that the call is being forwarded to an alternate recipient. The mobile device may also present a notification of the identity of the alternate call recipient. This informs the caller that the call is being forwarded or rerouted and tells the caller to whom the call is being forwarded. Assuming the alternate call recipient answers the forwarded call, the caller can then explain that he urgently needs to speak to the intended call recipient. This solution addresses the problem of how to contact a mobile subscriber who is unavailable. The presenting of these notification may be in response to receiving a message from the call-management server 200 indicating that the call is being forwarded and providing an identification of the alternate call recipient.

Unavailable, for the purposes of this specification, means either that the device is physically unable to receive a call or that the mobile subscriber is not answering. Unavailable may thus encompass instances where the device is shut off, out of battery, its RF transceiver is disabled, is out of wireless range, the wireless network is down, or any other such case. Unavailable also encompass instances where the user is not answering, either intentionally ignoring the call or unaware of the call because the ringer is off or cannot be heard, because the vibration cannot be sensed, or any other such reason that results in the call not being answered by the intended call recipient. Therefore, instances where the recipient is unavailable may also include calls that go to voice mail, calls that receive a busy signal, calls that are blocked, or calls that ring indefinitely (e.g. more than a predetermined number of rings or that ring for more than a predetermined period of time). In a variant, the call management server and/or the mobile device may be configured to set the maximum number of rings before the call is forwarded. In another variant, the call-management server and/or mobile device may be configured to automatically forward the call when voice mail is triggered. The mobile device may also provide an override to permit the caller to leave a voice mail message.

Identifying the alternate call recipient may be done in a number of ways. In most embodiments, the identification of the alternate call recipient is most efficiently performed by the call-management server 200 although in other embodiments the identification task may be offloaded, in whole or in part, to any other computing device, including the mobile device itself. The various identification techniques rely on information about the location, status or scheduled activities of the intended call recipient from which useful inferences may be drawn. This information may be obtained, extracted, gleaned or inferred from a number of data sources including, but not limited to, (i) meeting, event or appointment information stored in a calendar, schedule or agenda, (ii) presence information published by a presence server, (iii) status or check-in information from a social network personal profile, or (iv) social media posts, tweets or other recent publications, or (v) mobile user groups, or (vi) any other such sources. This information may also be determined or inferred from current location data by reverse geocoding the location coordinates of the mobile subscriber to obtain the name of a location (e.g. personal residence, workplace, restaurant, café, hotel, etc.) where the mobile subscriber is located.

FIGS. 2-5 depict example scenarios that illustrate these concepts in greater detail.

Figure 2:
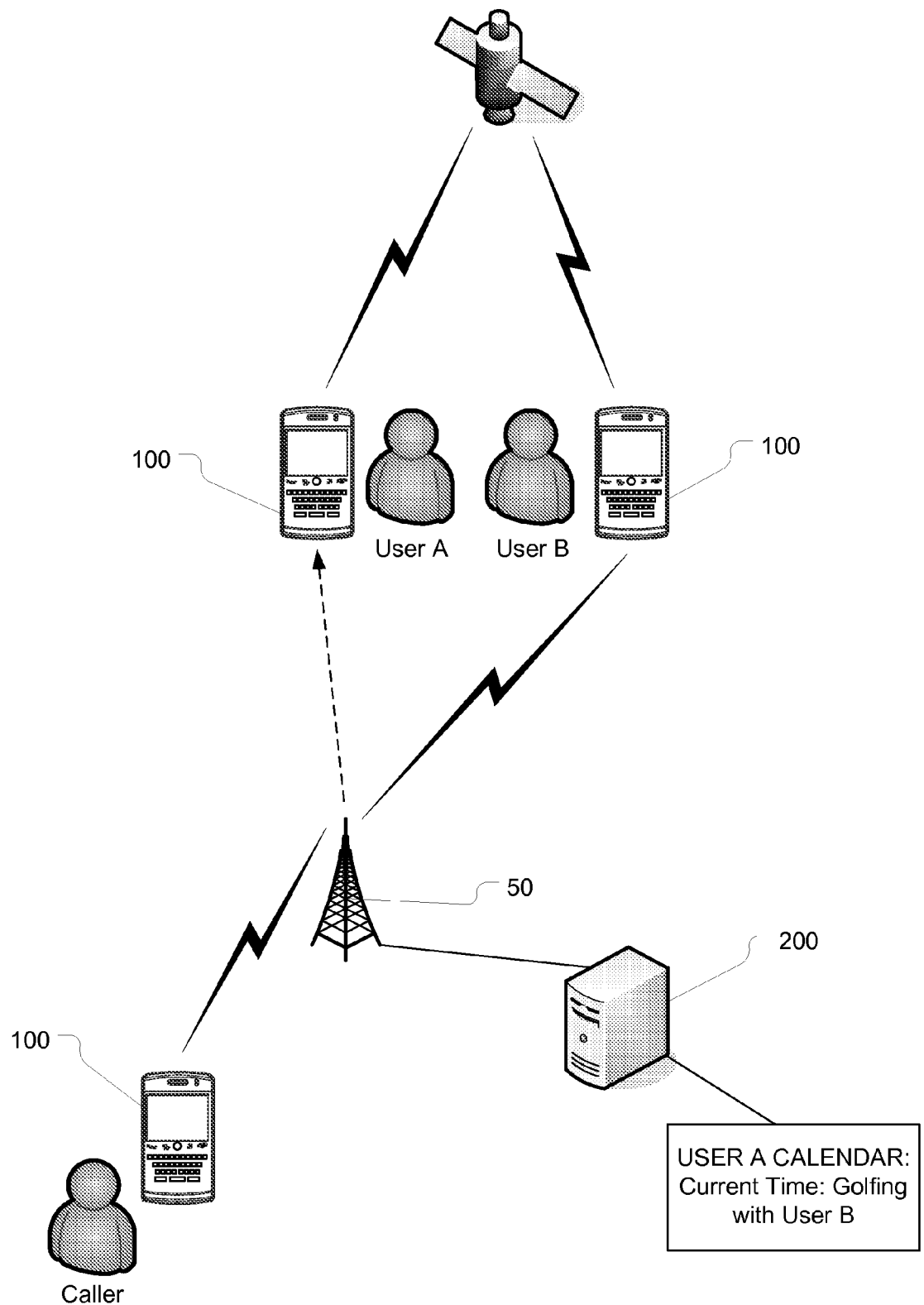
FIG. 2 depicts one example scenario in which a call is forwarded to an alternate call recipient who is identified from a calendar entry as being at the same location as the intended call recipient.

FIG. 2 depicts a first example scenario in which a call is forwarded to an alternate call recipient (User B) who is identified from a calendar entry associated with User A (the intended call recipient). The calendar entry indicates that User B (the alternate call recipient) is at the same location as User A (the intended call recipient). The calendar entry may indicate that User A is meeting with User B, attending an appointment with User B, working, traveling or playing with User B or is otherwise collocated or physically proximate to User B. For example, the calendar entry may indicate that User A is golfing with User B. Because they are together or proximate (i.e. nearby to one another), the call-management server 200 forwards the call to User B if User A is unavailable.

FIG. 2 thus illustrates one example of how the call-management server 200 identifies an alternate call recipient who is currently located within a predetermined proximity of a current location of the intended call recipient. Proximity, for the purposes of this specification, means that the intended and alternate call recipients are physically near to one another at the same time. Proximity in this sense requires both spatial and temporal proximity. The predetermined proximity may be expressed in terms of a distance or radius (e.g. within 5 meters, within 10 meters, within 50 meters, etc.) between User A's location data (e.g. User A's GPS coordinates) and User B's location data (e.g. User B's GPS coordinates) and also in terms of a time threshold. The calendar event may indicate that User A and User B were together from 1-2 p.m. If the call is placed at 2:01 p.m., it may be assumed that the users are still together or at least that they have not traveled far apart by that point. Thus, the predetermined proximity requires that the two users be at the same place at the same time within respective spatial and temporal tolerances. These thresholds and tolerances may be set and reconfigured as parameters in a device options and settings page and/or these may be configured or set at the call-management server.

Other proximity indicia may be employed. For example, if both devices are connected to the same Wi-Fi™ hotspot, then it may be assumed that the devices are proximate. User A may be connected to a Wi-Fi™ router at a hotel. If User B is connected (or has been recently connected) to the same hotel router, then it may be reasonable to infer User B and User A are both staying at the same hotel.

Another proximity indicator is data connectivity between devices. If User A's device is paired with User B's device, proximity may be readily inferred. Likewise, if the devices were recently exchanging data via short-range wireless protocol, e.g. Bluetooth, NFC, etc, then proximity may also be inferred, subject to the time threshold.

As depicted in FIG. 2, the calendar data is exploited in this example system by a call-management server 200 having access to a calendar associated with the intended call recipient. In main embodiments, the call-management server 200 receives, or is granted access to, calendar data associated with User A (i.e. the intended call recipient) and uses this calendar data to determine where the intended call recipient is currently located or what he or she is currently doing. In this embodiment, it is not necessary to share this calendar data with the caller, which thus respects the privacy of the intended call recipient. The call-management server 200 may itself have full access to the calendar (e.g. a shared calendar model) or, alternatively, it may only be permitted to query a calendar server hosting the calendar data that replies with only the minimum data required to identify the alternate call recipient, e.g. an address or GPS coordinates. In each case, the identification is performed by the call-management server without calendar details being shared with the caller, i.e. without granting access to the caller to the calendar or without sharing any calendar event data directly with the caller. In other words, the server 200 insulates the calendar from the caller, performing all identification and determination functions, and providing only a notification back to the caller that the call is being forwarded and, optionally, also providing an indication of the alternate call recipient's name.

In another embodiment, a shared calendar may be shared amongst trusted friends or contacts so that, in this particular embodiment, the caller's mobile device may access the calendar and make the determination as to the alternate call recipient. Sharing may be accomplished using a data pull model when the caller is attempting to reach User A or, alternatively, the data may be pushed to the caller pre-emptively. In this embodiment, t the call-management server 200 may require User A to grant access to the caller (grant trusted status). For example, if User A is going out for dinner with her husband and does not wish to be disturbed while at the restaurant, she may grant a babysitter temporary or permanent access to her calendar to enable calls to be forwarded based on her calendar events. In another implementation, which does not require any such configuration, the server 200 receives a query from the calling device when User A is determined to be unavailable to receive an emergency or high-priority call. Without granting full unfettered access to the calendar, the server may simply reply to the query to provide the person, location, event or establishment entered in the calendar for the current calendar event for User A. Alternatively, a list of pre-approved callers (a "whitelist") may be implemented to only permit access to the calendar event data for designated callers, for callers who are contacts stored in User A's address book, or for callers having a password, authentication token, etc.

Figure 3:
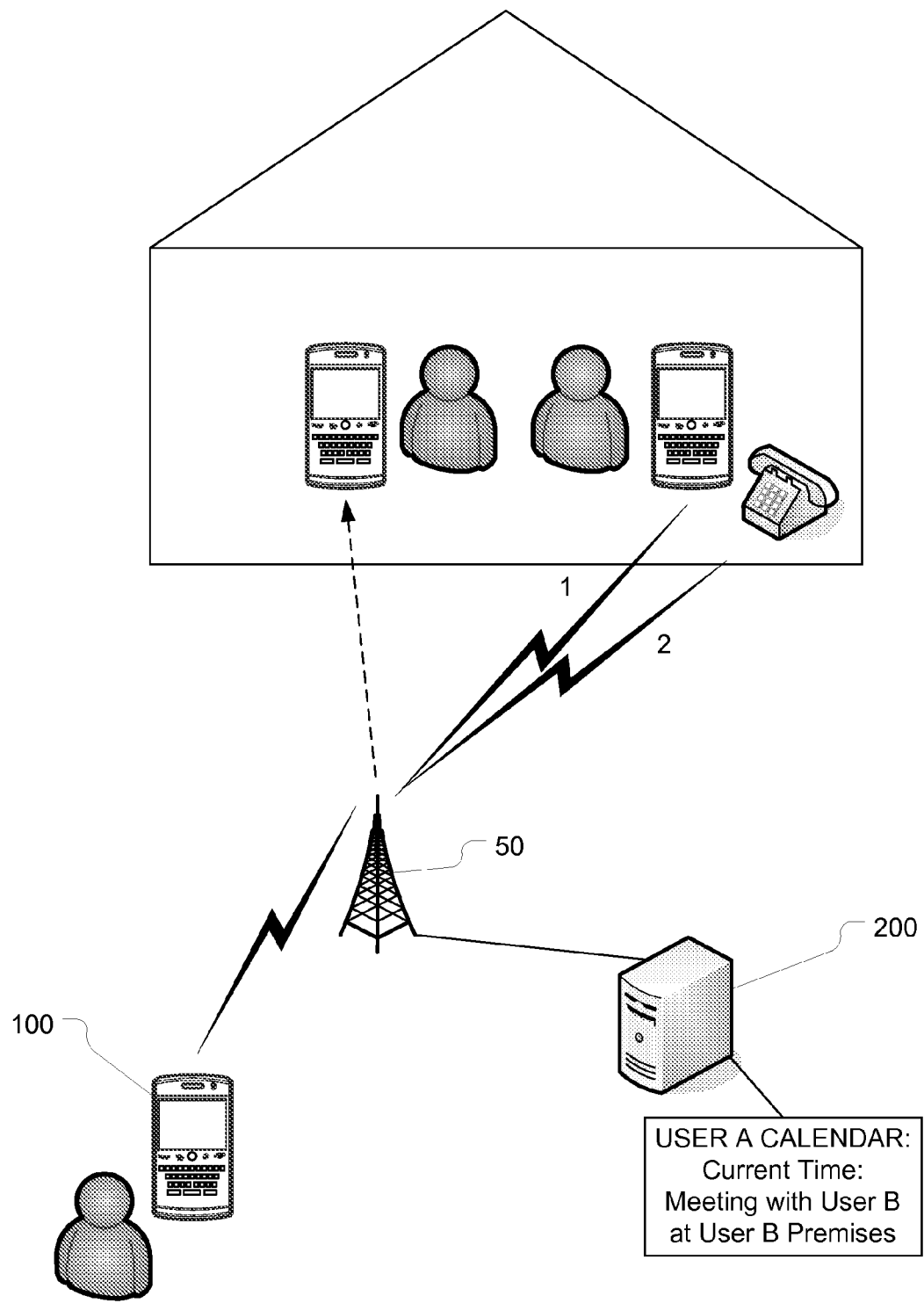
FIG. 3 depicts another example scenario in which a call is forwarded to an alternate call recipient who is meeting with the intended call recipient at the alternate call recipient's premises.

FIG. 3 depicts another example scenario in which a call is forwarded to an alternate call recipient who is meeting with the intended call recipient at the alternate call recipient's premises. In this example, there may be multiple telephone numbers associated with User B, e.g. his mobile device and the residential landline. The device may be configured to forward the call to each number sequentially. The mobile device or call-management server may prioritize these numbers, e.g. forward the call first to the mobile device and then to the landline phone or vice versa. Prioritization may be performed based on date, time of day or even based on a calendar shared by User B.

In one implementation, the call-management server may try all of the phone numbers associated with the intended call recipient prior to forwarding the call to the alternate call recipient. In other words, the intended call recipient may have in addition to a first (main) phone number associated with his mobile device one or more secondary phone numbers associated either with the same device or with other devices owned, operated or otherwise associated with the same mobile subscriber.

This provides another computer-implemented method of call forwarding in which any secondary phone numbers associated with the intended call recipient are first tried before forwarding the call to the alternate call recipient. In general, such a method entails, in response to determining that an intended call recipient is unavailable to receive a call from a caller via a first phone number, determining if the intended call recipient has a secondary phone number. This determination may be performed by the call-management server by determining what other numbers are associated with the mobile device or what other devices are associated with the subscriber. Thus, the call may first be forwarded to the secondary number (or sequentially to a plurality of secondary numbers). If the intended call recipient is still unavailable, the call is then forwarded to the alternate call recipient. In other words, the method entails, in response to determining that the intended call recipient is unavailable to receive the call via the secondary phone number, identifying an alternate call recipient proximate to the intended call recipient and forwarding the call to the alternate call recipient.

In one specific implementation, forwarding the call may be done automatically, i.e. by the device or call management server without any user intervention or user input. In another specific implementation, the device (or the call-management server via the device) forwards the call in response to user input. In such an implementation, the device may, for example, prompt the caller to provide input to cause the device to forward the call. This input may be manual input or voice input.

In one implementation of this method, the call-management server 200 transmits a textual message (IM, e-mail, SMS, MMS, etc.) to the intended call recipient to notify the intended call recipient that the caller is urgently attempting to contact the intended call recipient. The message may be automatically generated by the call-management server. The message may provide one or both of: (i) a call-back user interface element to automatically initiate a call back to the caller and (ii) a name and number of the caller. In one implementation, the call management server 200 may send a textual message via IM, SMS, MMS, e-mail, social network platform or any equivalent means, or any combination thereof, to the intended call recipient to notify the intended call recipient that the caller is urgently trying to reach the intended call recipient. The textual message may identify the caller and the time of the call, and may also provide call back information such as the caller's phone number. The message may contain a call-back hyperlink or other such user interface element that automatically initiates a call back on receipt of user input from the intended call recipient. The message may also indicate that the call has been forwarded to an alternate call recipient, whose identity may optionally be specified in the message. The message may be automatically generated by the call management server or it may be composed in whole or in part by the caller. In the latter case, the caller may include message text describing the nature of the urgency and/or the reason for the call.

Figure 4:
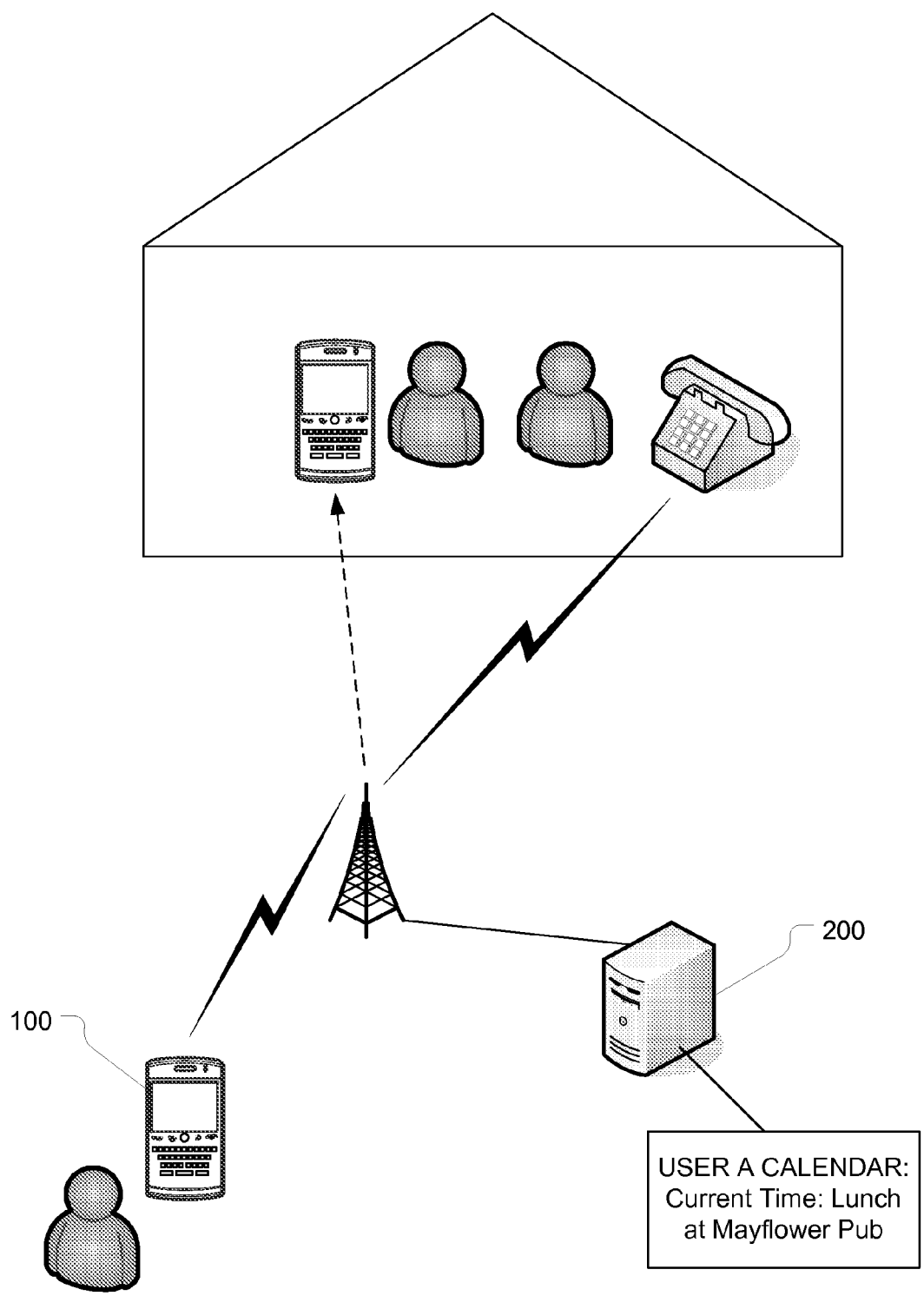
FIG. 4 depicts another example scenario in which the call is forwarded to an establishment identified in the intended call recipient's calendar.

FIG. 4 depicts another example scenario in which the call is forwarded to an establishment identified by referring to, or querying, the intended call recipient's calendar. As noted above, the calendar may be accessible by the call-management server 200. The establishment may be any private residence or commercial establishment (restaurant, café, pub, hotel, gym, spa, hair salon, workplace, school, college, university, medical or dental clinic, hospital, arena, government office, shopping center, mall, boutique, grocery store, supermarket, pharmacy, etc.). In this example, the calendar entry of User A's calendar indicates that User A is having lunch at the Mayflower Pub. If User A is found to be unavailable (i.e. a call to User A cannot be placed or if User A is not answering his phone), then the call is automatically forwarded by the call-management server to a telephone number associated with the Mayflower Pub. This may be, for example, a landline (POTS) telephone in the premises that is answered by an owner or manager of the pub (or by any waiter, waitress or employee) who can then be asked to search for the intended call recipient in the pub. For example, this number may be obtained by performing a lookup of a web-based phone directory or by performing an automatic web search for "Mayflower Pub" and parsing website content for a telephone number. The caller may then request that the intended call recipient be advised of the emergency. In one implementation, the mobile device or call-management server may automatically transmit a digital photograph and/or a textual description of the intended call recipient to facilitate the task of finding that person at the premises.

Figure 5:
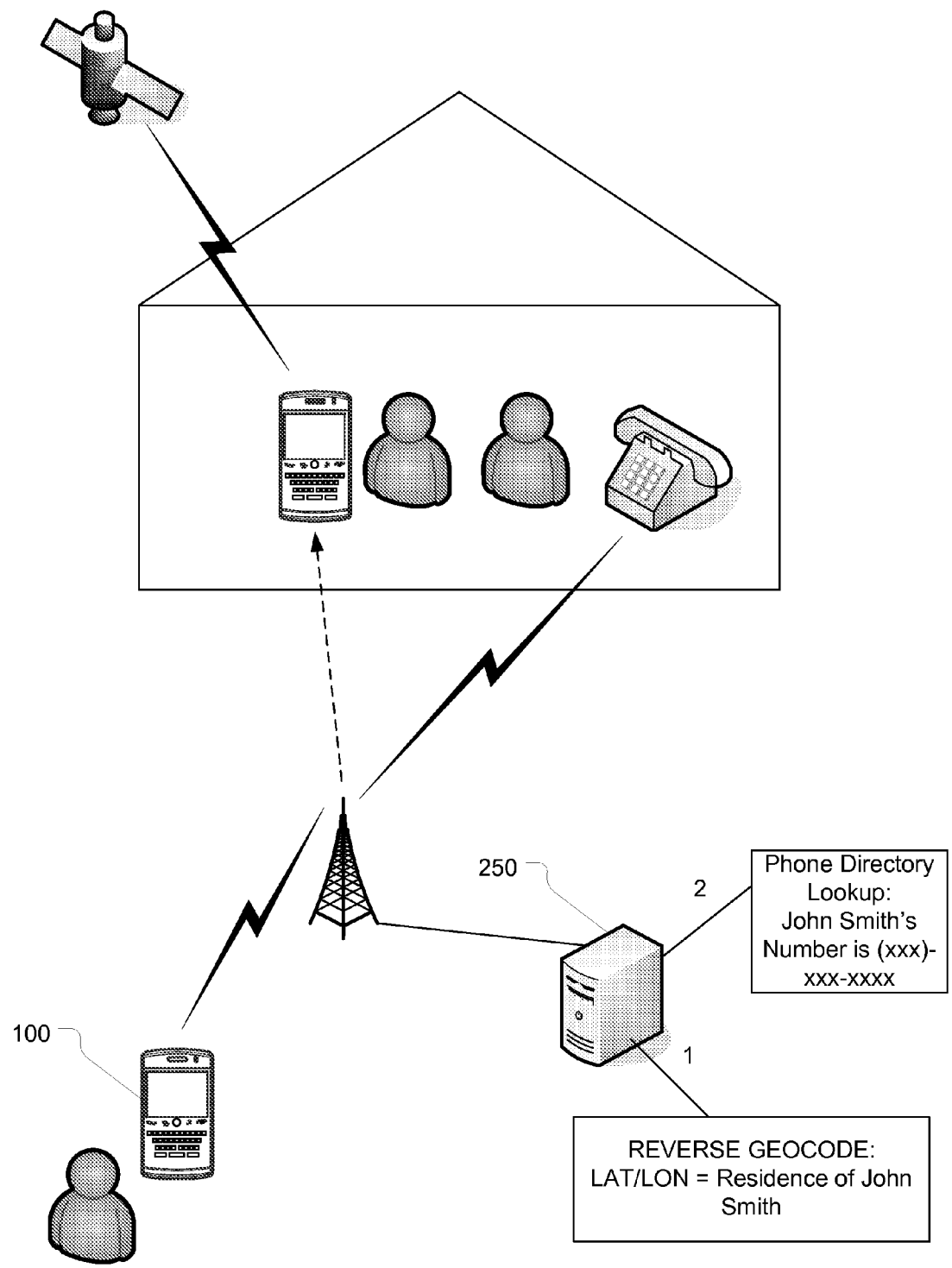
FIG. 5 depicts another example scenario in which a location of the intended call recipient is reverse geocoded to identify an establishment for which a telephone number is then determined.

FIG. 5 depicts another example scenario in which a location of the intended call recipient is reverse geocoded to identify an establishment for which a telephone number is then determined. In this example depicted in FIG. 5, location data for the location of User A (the intended call recipient) is determined. This location data may be current or at least sufficiently current to accurately predict that the user is likely to be present at that location. For example, if wireless connectivity is lost because the user has moved inside an RF-shielded building, further location updates from the mobile device associated with the intended call recipient cannot be shared wirelessly through the wireless network. In this case, the device's last known location stored by the call-management server may be used, provided it is within a predetermined time threshold. For example, the last known location may be used if the last location update is less than 10 minutes old. The current (or last known) location coordinates are reverse geocoded to provide a name of a personal residence or establishment where the user is located. This residence or establishment is then looked up in a telephone directory, personal address book, or other web-hosted database to determine a telephone number for the residence or establishment. This residence, establishment or other such entity becomes the alternate call recipient. The call is then forwarded automatically to the alternate call recipient.

In the example of FIG. 5, the last known GPS location coordinates are reverse geocoded to indicate that the location corresponds to the residence of a person, e.g. John Smith. John Smith's telephone number (the alternate call recipient) is then determined by looking up that name in an address book or a public telephone directory, e.g. a web-based directory or other searchable database. In one embodiment, the call-management server is permitted limited or unlimited access to the address book of the intended call recipient which may be stored at, or accessible by, the call-management server 200/250. In the illustrated embodiment, an augmented call-management server 250 includes both a reverse-geocoding module and a directory lookup module. In other words, in this illustrated embodiment, the call-management server 250 includes, or has access to, a geographical information database and the reverse-geocoding software for converting geographical coordinates into place names. The server 250 also includes, or has access to, a directory lookup module for looking up telephone numbers. Alternatively, the server 250 may be replaced with a server that processes queries and consults separate (e.g. third-party) reverse-geocoding and phone directory servers. The single server 250 may be replaced by a server cluster or may even be implemented in a cloud-computing environment.

In one embodiment, the identifying of the establishment entails obtaining speed data of the mobile device associated with the intended call recipient. This speed data is taken into consideration to ensure that the mobile device (and thus presumably the intended call recipient) is actually situated at that location in more than merely a transient fashion, i.e. that the intended call recipient will likely be at that establishment for at least a predetermined amount of time, e.g. at least the time required to call the establishment and ask for the intended call recipient. For example, if a mobile subscriber is driving, riding, biking, or even walking past a number of establishments that are successively reverse-geocoded, these establishments are not identified as the place where the intended call recipient can be found. In other words, if the intended call recipient (mobile subscriber) is moving at a speed above a particular speed threshold, calls would not be forwarded to the establishments identified by reverse geocoding, i.e. the call-management server 200/250 would not identify each successive restaurant as the establishment where the intended call recipient is located. Only once the mobile subscriber has remained at a relatively fixed location (within a certain predefined range, e.g. within a radius of 10 meters) for a predetermined amount of time (e.g. more than 1 minute) is the inference drawn that the intended call recipient is static and can potentially be reached by forwarding the call to the establishment identified as being situated at that location.

FIGS. 6 to 12 present examples of user interfaces of a mobile device 100 that enable the user to interact with these novel call-forwarding technologies. These user interfaces are presented solely by way of example and it will be appreciated that the particular layout of the user interface elements and their specific names/labels may be different. It will also be appreciated that other user input techniques may be used, such as voice commands and/or physical keys (as opposed to the illustrated touch-screen interface). In another embodiment, contactless gestures may be recognized by a contactless gesture recognition subsystem.

Figure 6:
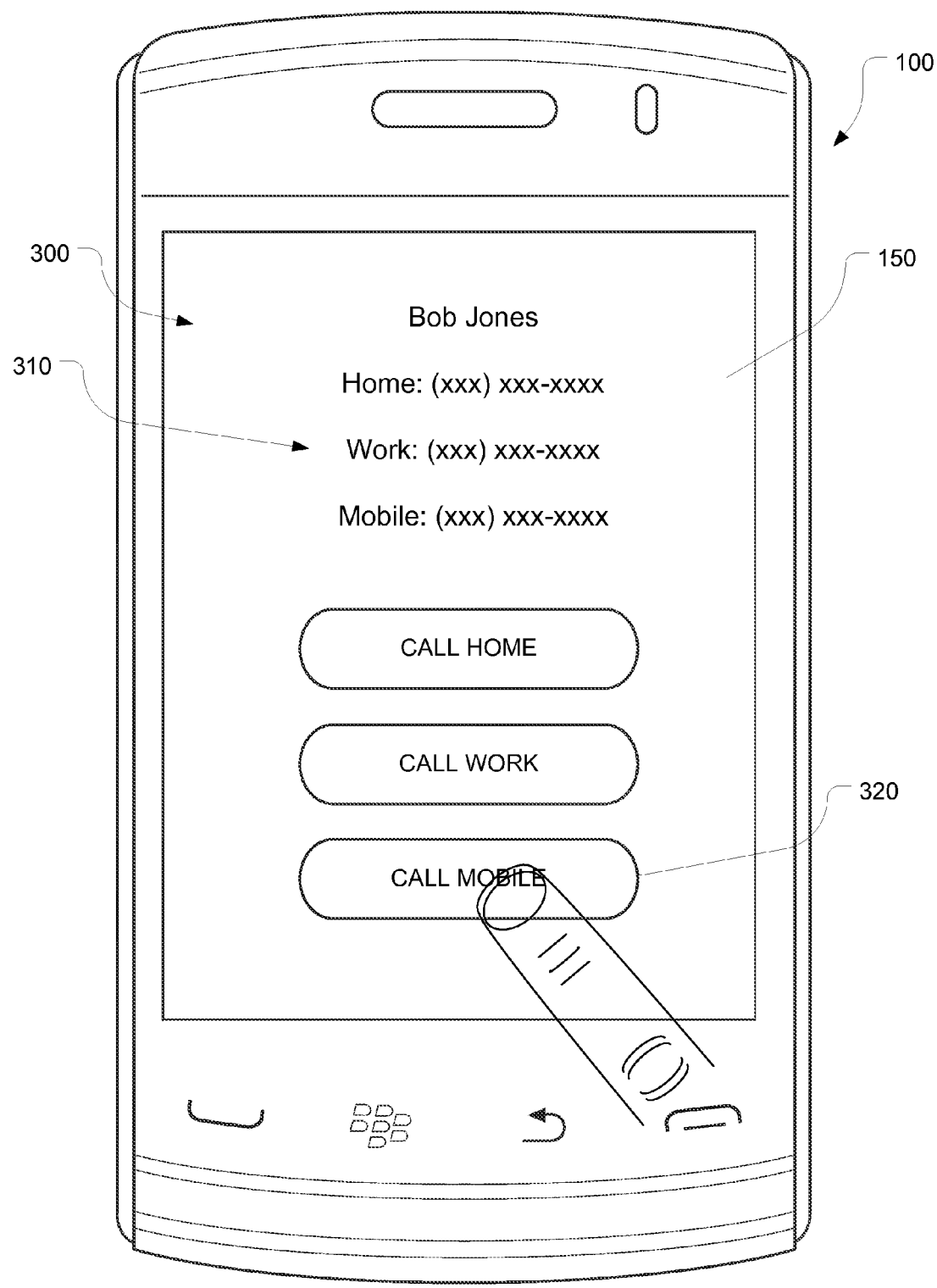
FIG. 6 is an example of a touch-screen user interface on a mobile device for initiating a telephone call to one of the telephony devices associated with an intended call recipient.

FIG. 6 is an example of a touch-screen user interface 300 on a mobile device 100 that enables the caller to initiate a telephone call to one of the telephony devices associated with an intended call recipient. In this example, the user accesses a contact Bob Jones who is, in this example, the intended call recipient. The user interface 300 presents on display 150 the name of the intended call recipient Bob Jones, displays a list 310 of his home, work and mobile numbers and provides touch-sensitive user interface elements 320 for calling any one of these numbers. FIG. 6 shows the caller touching the Call Mobile user interface element. This input is accepted by the device as a command to initiate or set up a call with the intended call recipient Bob Jones.

Figure 7:
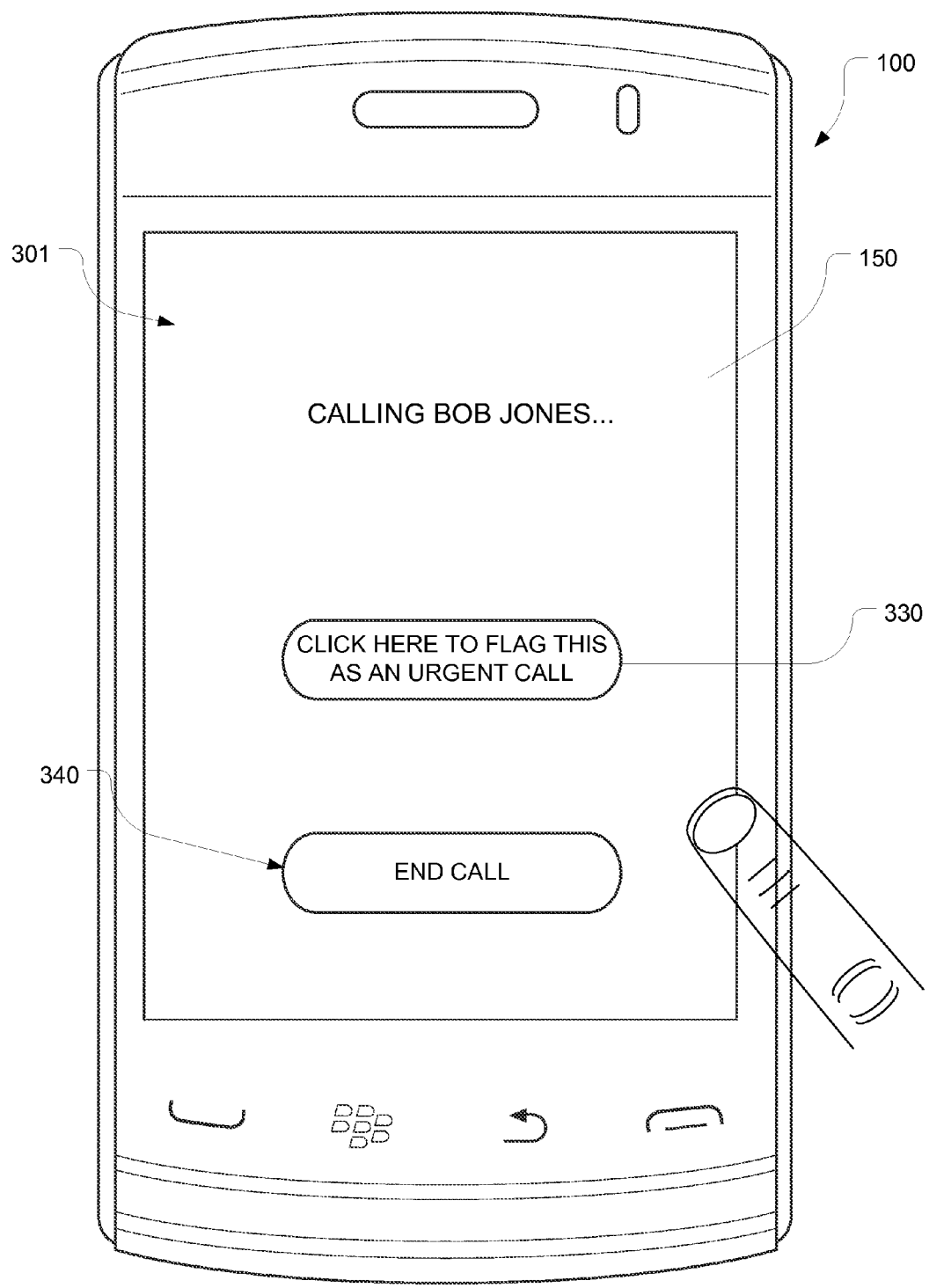
FIG. 7 is an example of a subsequent user interface indicating that the mobile device is calling the intended call recipient and further providing an optional feature to flag the call as urgent.

FIG. 7 depicts a subsequent user interface 301 that indicates that the mobile device is calling Bob Jones (the intended call recipient). A call status indicator 301 shows "Calling Bob Jones . . . " An optional emergency designator element 330 is displayed by way of example. This element 330 enables the user to designate or flag the call as urgent (i.e. a high-priority or emergency call). The user interface 301 provides a further user interface element 340 to end the call. In another implementation, call-forwarding is automatically enabled (without requiring any input to signify that the call is urgent).

Figure 8:
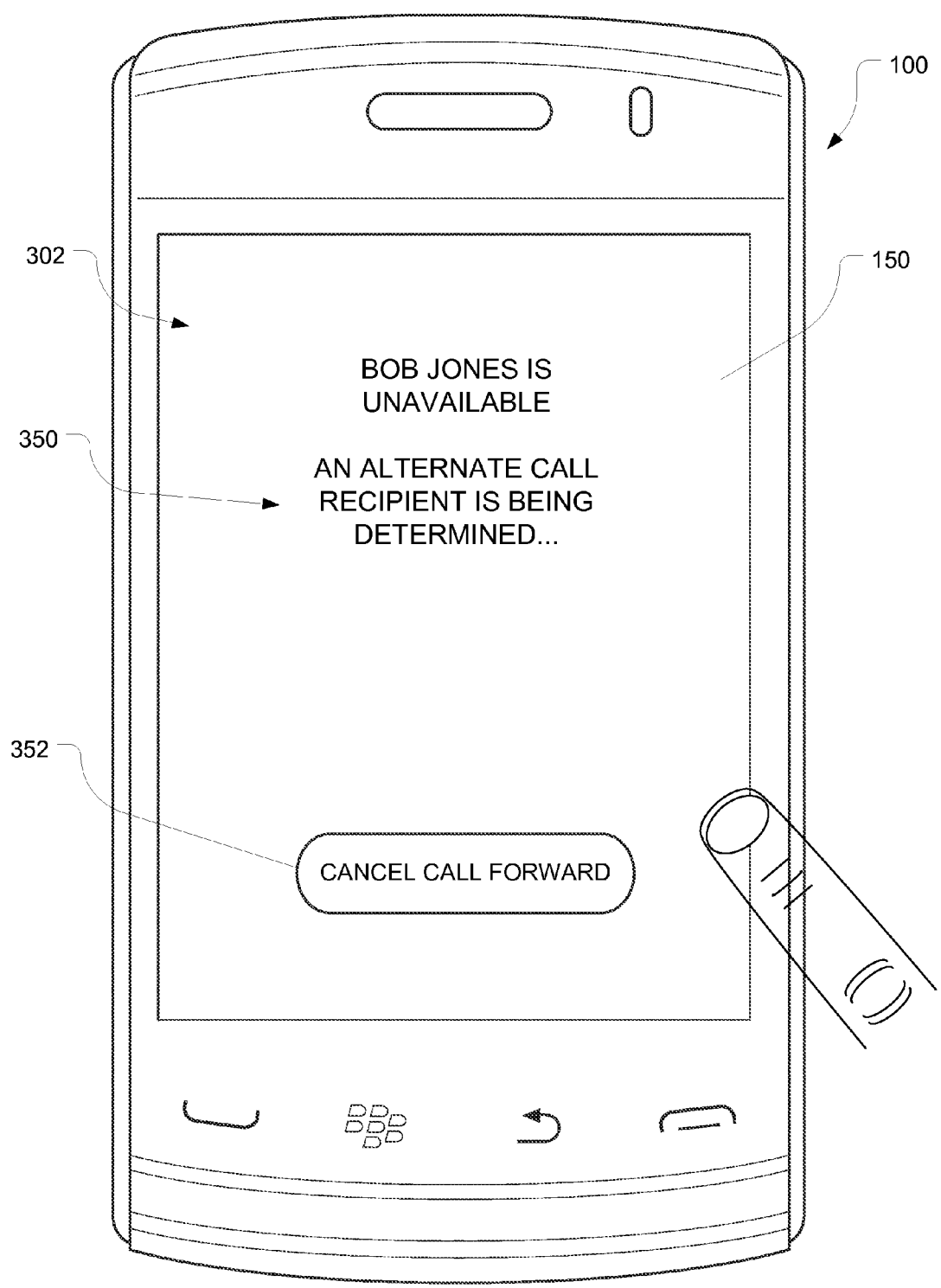
FIG. 8 is an example of a subsequent user interface indicating that the intended call recipient is unavailable and that an alternate call recipient is being determined.

FIG. 8 is an example of a subsequent user interface 302 that indicates that the intended call recipient Bob Jones is unavailable. Optionally, more detail may be provided (device turned off, not answering, no wireless service, etc). An alternate recipient determination notification 350 is displayed to notify the caller that an alternate call recipient is being determined by the device. The caller may interrupt this automatic determination process by touching element 352 to cancel the call forwarding. The caller may do this in a scenario where the caller wishes instead to call 911 or to call a different person. Optionally, the device may display an emergency call button, e.g. "Call 911", "Call 999", Call "112", etc., depending on the country in which the device is located.

The determination or identification of the alternate call recipient may be performed by the call-management server or other suitable computing device in response to the call not being connected or answered in which case the notification shown in FIG. 8 may be displayed onscreen while the call-management server undertakes the process of identifying the alternate call recipient. In another embodiment, the identification of the alternate call recipient may begin pre-emptively by the call-management server as soon as the caller indicates to the call-management server that the call is urgent or high-priority (i.e. even before it is known whether the intended call recipient is available or unavailable). As described with reference to FIG. 7, this may be done by touching user interface element 330 (which flags the call as an urgent call).

As described above, the call-management server 200/250 may identify an alternate call recipient in a number of different ways. One such way is to obtain current location data (e.g. GPS data, WPS data, cell tower triangulation data, accelerometer data, etc.) for the intended call recipient. The mobile device 100 may optionally display the current location of the intended call recipient and the source of the current location data in response to receiving this information in a message from the call-management server. Optionally, the mobile device may ask the caller to validate or confirm that this data is to be used as the basis for identifying an alternate call recipient. In this optional embodiment, the validation/confirmation message would then be transmitted back to the call-management server before the latter actually forwards the call. As noted above, the location coordinates are then reverse geocoded by looking up the coordinates in a location database or geographical information database that provides the name of a person or establishment associated with the location. For example, the lookup may indicate that the location is a certain person's house or a certain restaurant or café. The telephone number associated with that person's house or the restaurant or café is then determined, e.g. by the call-management server. In one embodiment, the mobile device may prompt the caller to confirm that this alternate call recipient is to be used before the call is forwarded. In another embodiment, the call is forwarded to that number without seeking confirmation from the caller. Assuming that somebody answers the forwarded call at that establishment, the caller may then ask to speak to the intended call recipient. This is particularly useful in an emergency when the caller needs to speak urgently to the intended call recipient.

Figure 9:
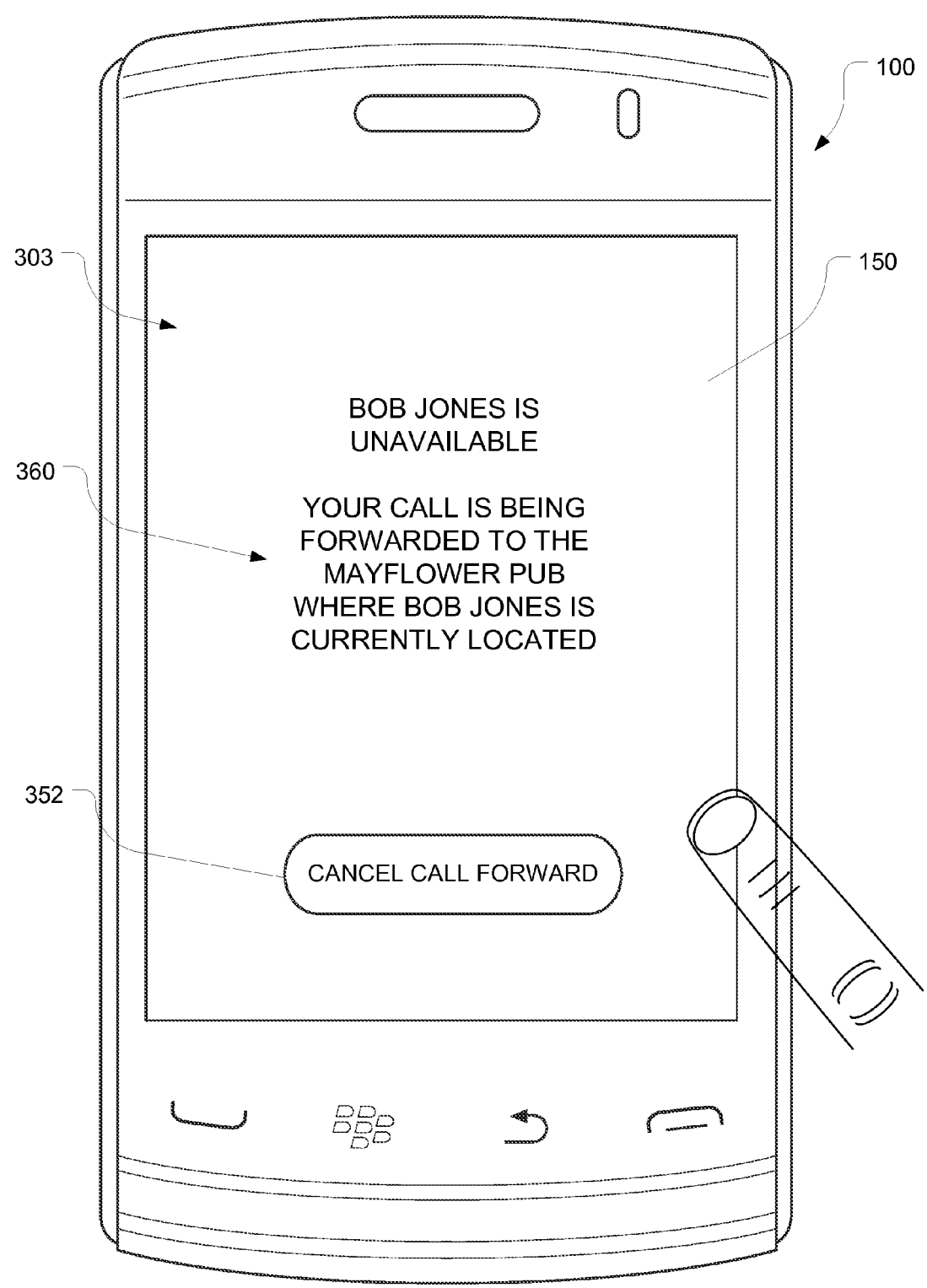
FIG. 9 is an example of a subsequent user interface indicating that the call is being forwarded to an establishment where the intended call recipient is located.

FIG. 9 is an example of a subsequent user interface 303 indicating that the call is being forwarded to an establishment where the intended call recipient is located. In this example, a call-forwarding notification 360 notifies the caller that the call is being forwarded to an alternate call recipient. In this example, the alternate call recipient is the Mayflower Pub. Optionally, as shown in FIG. 9, the call-forwarding notification may further indicate that this is where Bob Jones is currently located. A cancel call forward button 352 may be provided as shown in FIG. 9.

Figure 10:
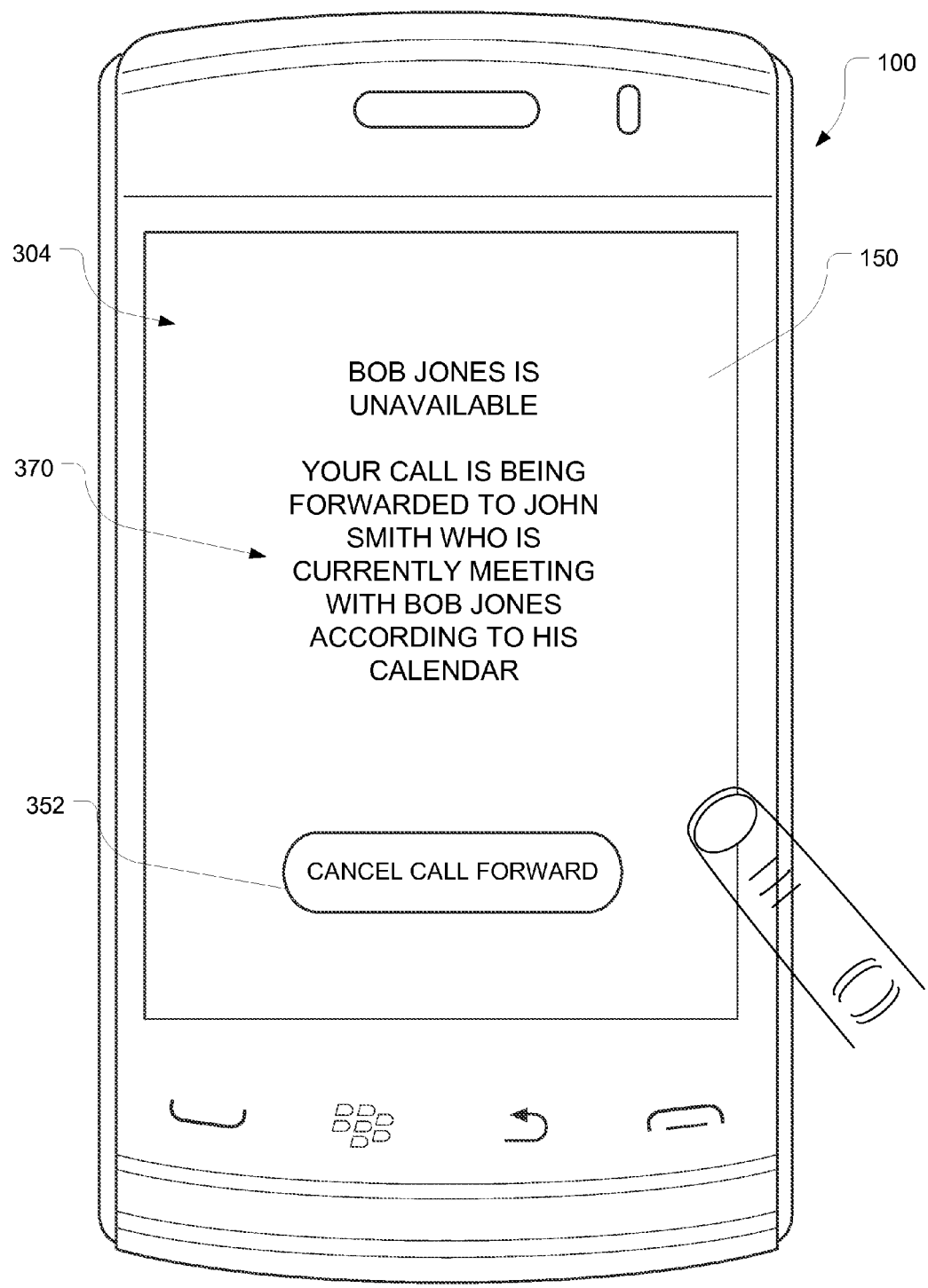
FIG. 10 is an example of an alternative user interface indicating that the call is being forwarded to a person who is currently meeting with the intended call recipient.

FIG. 10 is an example of an alternative user interface 304 indicating that the call is being forwarded to a person (John Smith) who is currently meeting with the intended call recipient. The call-forwarding notification 370 displays the name of the alternate call recipient (John Smith) and the event/activity/status (meeting with Bob Jones) and the source (according to the calendar). The cancel call forward button 352 may also be displayed on this UI 304.

Figure 11:
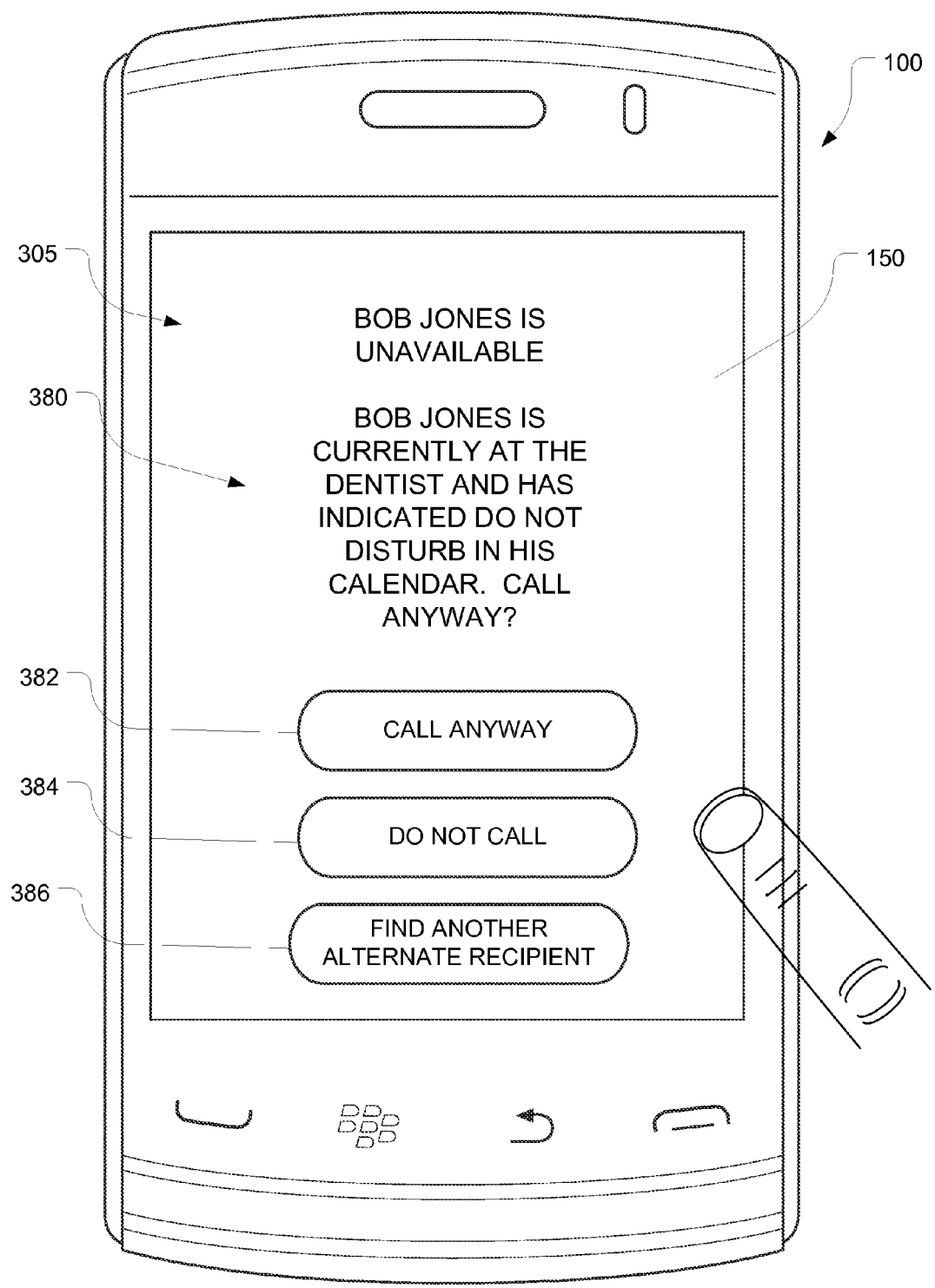
FIG. 11 is an example of a user interface that indicates that the intended call recipient does not wish to be disturbed, and providing options to call anyway, to not call, or to find another alternate recipient.

In one implementation, each mobile subscriber may be able to configure his own privacy settings for screening or filtering incoming calls. These privacy or do-not-disturb (DND) settings may specify when, where and by whom the call recipient may be disturbed. The alternate call recipient may thus have specified, for example in his calendar entry, that he is not to be disturbed while he's at a dentist appointment or while delivering a speech at a symposium. The privacy/DND settings may be shared with the call-management server, a presence server, a shared calendar application or any other such platform that enables the caller's device to receive this privacy/DND data. For example, the privacy/DND settings may be stored at the call-management server 200. As shown in FIG. 11, the device 100 may indicate when placing the call to the alternate call recipient that the alternate call recipient does not wish to be disturbed. This may be displayed, for example, as part of a DND notification 380 presented on the display screen 150 of the device.

As illustrated by way of example in FIG. 11, the UI 305 may display user interface elements 382, 384, 386 providing various options to call anyway (element 382), do not call (element 384) or to find another alternate recipient (element 386).

Figure 12:
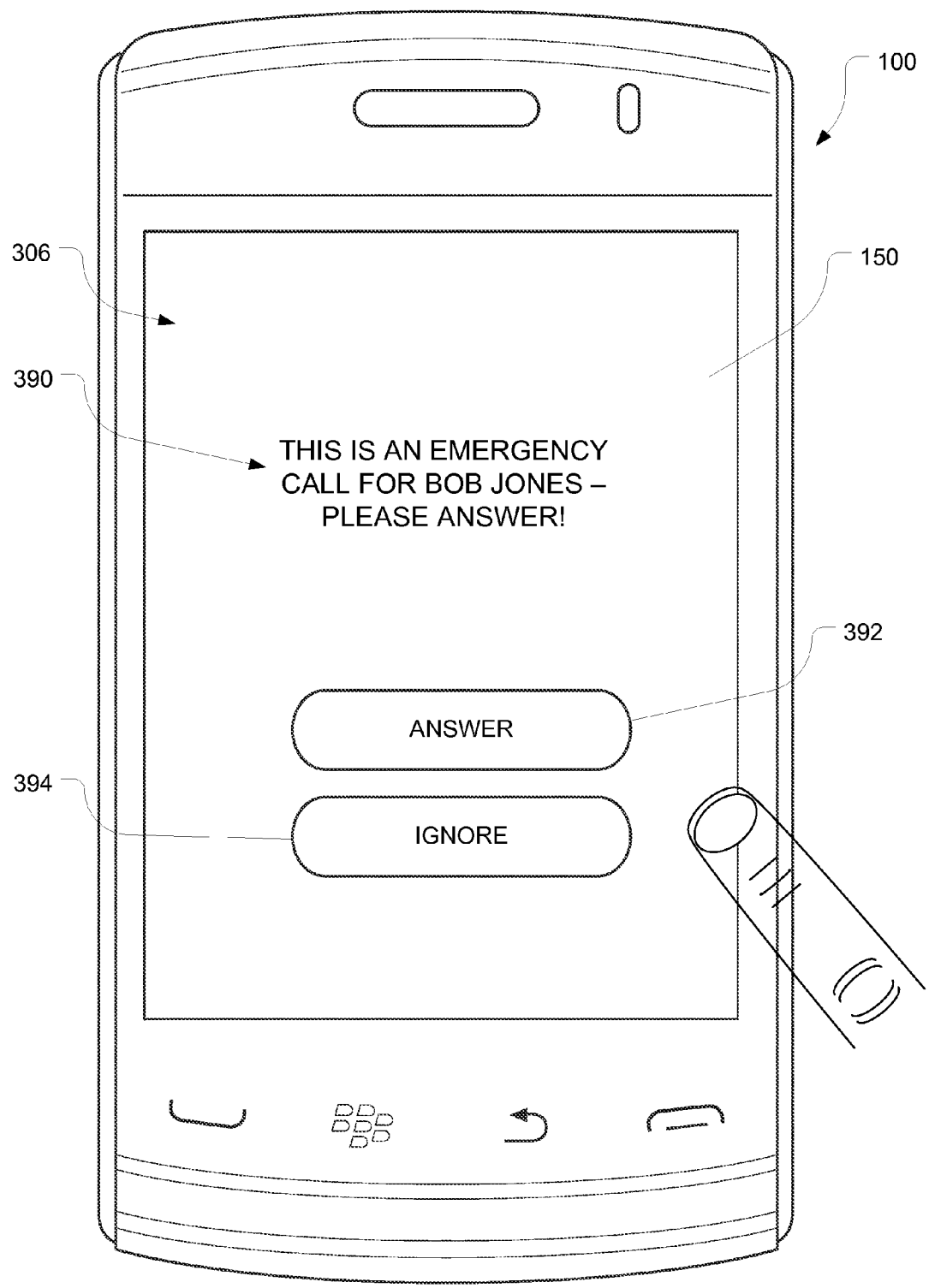
FIG. 12 is an example of an incoming call user interface on the mobile device receiving the forwarded call, the user interface displaying caller identification data indicating to the alternate call recipient that this is an emergency call for the intended call recipient.

FIG. 12 is an example of a user interface on the mobile device 100 that is receiving the forwarded call. As shown in FIG. 12, the display screen 150 displays emergency-augmented caller identification data indicating to the alternate call recipient that this is an emergency call for the intended call recipient. This emergency-augmented caller identification data is displayed on the display 150 (and/or audibly spoken) to alert the alternate call recipient that the incoming call is very important and urgent. Otherwise, the alternate call recipient may not recognize the incoming caller's name or number and might therefore be tempted to ignore the incoming call. The information displayed in the caller ID fields may contain wording such as shown by way of example in FIG. 12: "This is an emergency call for Bob Jones—please answer!". Other wording may be utilized. In the illustrated embodiment, the name of the intended call recipient is displayed as part of the information displayed. Optionally, the relationship between caller and intended call recipient may be displayed as well, e.g. "This is an emergency call for Bob Jones (my father)" or "Please answer—I urgently need to reach my brother Bob Jones".

In another implementation of the present technology, a mobile user group may also be used as the basis for identifying a nearby user. The mobile user group may be formed of any group or association of mobile subscribers who share some common interest, relationship or link such as, for example, work colleagues, family members, friends, business associates, conference attendees, players on a sports team or league, members of a club, travelers who form part of a tour group, etc. Any criterion may be used to create a mobile user group. Any mobile subscriber who is nearby may be contacted as the alternate call recipient.

In another implementation, the address book is used to determine if any trusted friend is nearby. In this implementation, prior to forwarding the call to the establishment, the device instructs the call-management server 200 to determine whether any trusted friends or colleagues (contacts from the address book) are in the immediate vicinity. Rather than calling the restaurant, it may be preferable to call a trusted friend who is sitting at the café next door or across the street. The device may be user-configured to select a more distant trusted friend rather forward the call to the restaurant.

Figure 13:
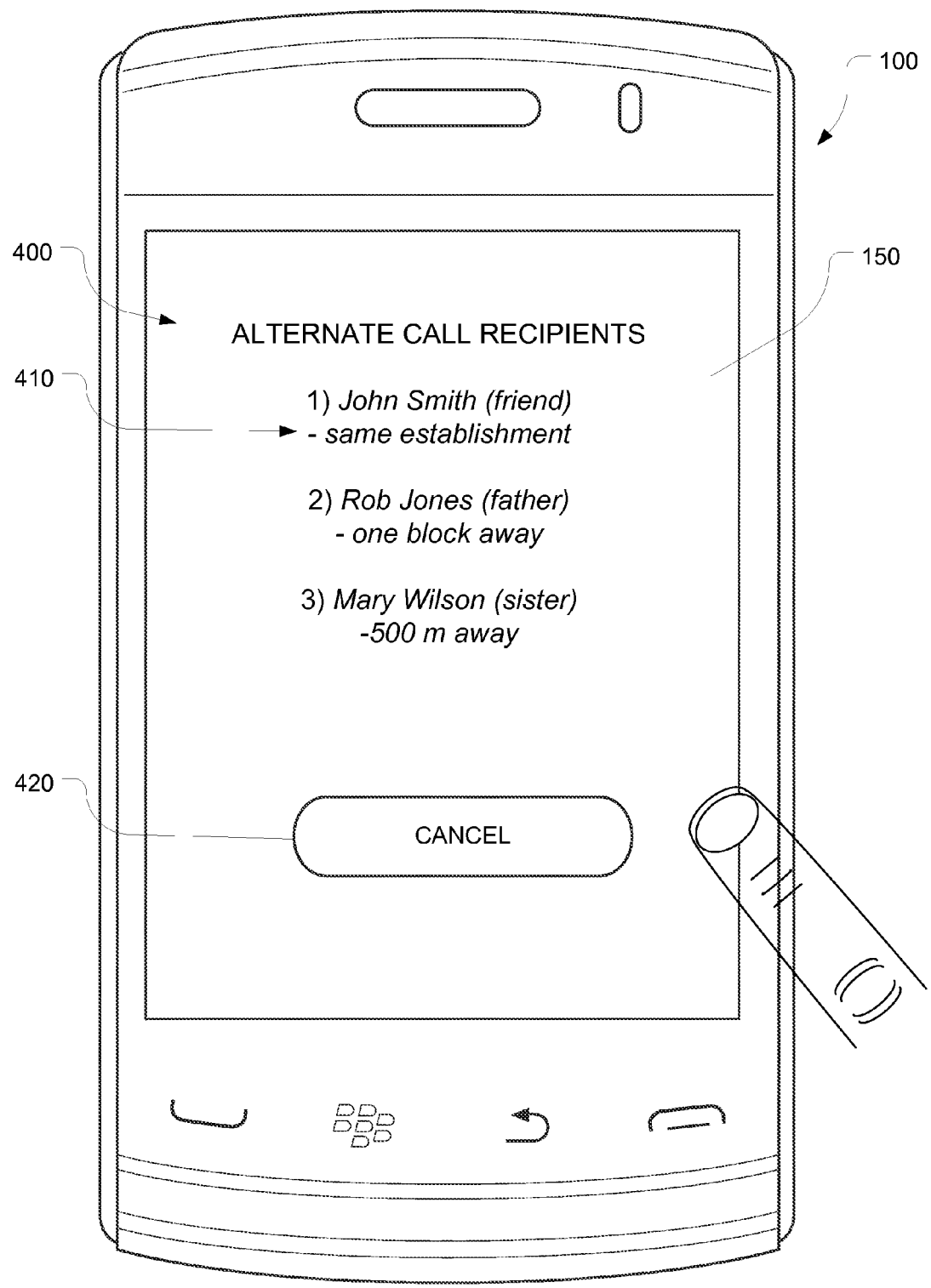
FIG. 13 depicts an example of a user interface that presents alternate contacts for the caller to select to whom the call will be forwarded.

In another implementation, depicted in FIG. 13, the device may present a list 410 of alternate call recipients on an alternate call recipient selection page 400. This list may be prioritized based on proximity to the intended call recipient. For example, the closest alternate call recipient is John Smith, followed by Rob Jones, followed by Mary Wilson. The proximity to the intended call recipient may also be displayed as shown by way of example in FIG. 13. The relationship to the intended call recipient may also be displayed. A user interface element 420 to cancel the alternate call recipient selection page 400 may be displayed as shown in this figure. The user may touch any of the listed alternate call recipients to cause the device to instruct the call-management server to forward the call to that individual's device.

Figure 14:
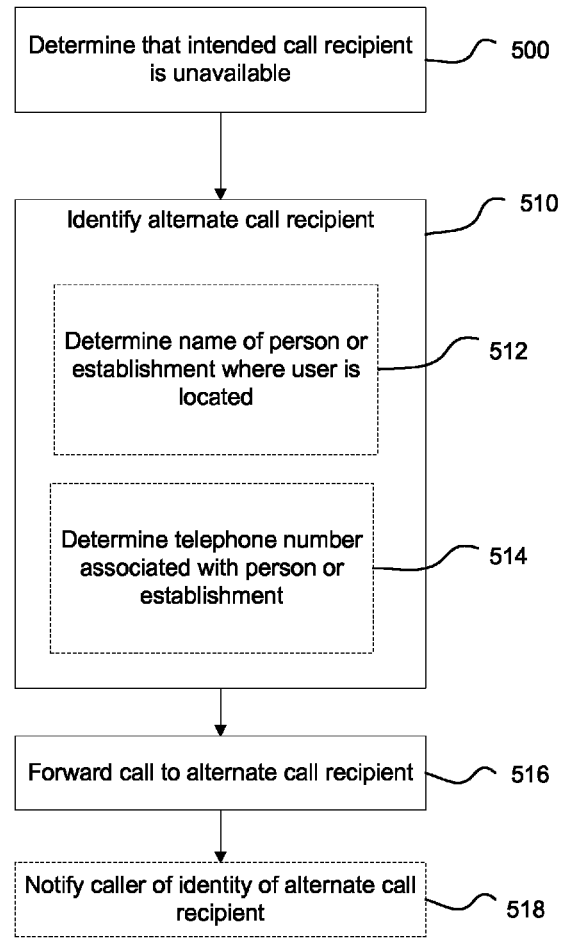
FIG. 14 depicts a flowchart of a method in accordance with a main implementation of the present technology.

The foregoing technology also enables novel methods of location-based call forwarding. In general, as depicted in FIG. 14, the method involves a step 500 of determining that an intended call recipient is unavailable to receive a call from a caller. In response to determining that an intended call recipient is unavailable, the method involves a step 510 of identifying an alternate call recipient located within a predetermined proximity of a current location of the intended call recipient. This identifying step 510 may, for example, involve a step 512 of determining a name of a person or establishment that corresponds to the location of the intended call recipient. In one embodiment, at step 514, the identifying step involves determining a telephone number associated with that person or establishment. The method involves a step 516 of forwarding the call to the alternate call recipient. Optionally, at step 518, the caller is notified (visually and/or audibly) of the identity of the alternate call recipient. In one implementation, the notifying step may involve notifying the caller that the intended call recipient is unavailable, notifying the caller that the call is being forwarded to an alternate recipient, and notifying the caller of the identity of the alternate call recipient.

In one implementation, identifying the alternate call recipient comprises determining a name of a person with whom the intended call recipient is meeting or the name of an establishment where the intended call recipient is located, and then determining a telephone number associated with the person or establishment.

In one implementation, identifying the alternate call recipient comprises determining a name of the alternate call recipient from a calendar entry of a calendar associated with the intended call recipient indicating that the intended call recipient is meeting with the alternate call recipient, and then determining a telephone number associated with the alternate call recipient.

In one implementation, identifying the alternate call recipient comprises determining a name of an establishment from a calendar entry of a calendar associated with the intended call recipient indicating that the intended call recipient is at an event at the establishment, and then determining a telephone number associated with the establishment.

In one implementation, identifying the alternate call recipient comprises determining a current location of the intended recipient from a calendar entry of a calendar associated with the intended recipient, identifying a person or establishment associated with that location, and then looking up a telephone number associated with the person or establishment.

In one implementation, identifying the alternate call recipient comprises determining a current location of the intended recipient from a social network check-in status published on a social network site as part of an online personal profile associated with the intended recipient, identifying a person or establishment associated with that location, and then looking up a telephone number associated with the person or establishment. Aside from the various examples above involving calendar entries, the location information may be obtained from a social network site or platform. For example, some social network platforms enable a user to check in at a location. This check-in information may indicate, for example, that the user is checked into a coffeehouse or restaurant at a certain address. This check-in status information may be mined to provide location information about the user. Other social media may be mined for location information. This information may be found in recently uploaded posts, tweets, or any other content that purports to indicate where the user is situated.

In one implementation, identifying the alternate call recipient comprises determining a current location from location data shared by a mobile device associated with the intended call recipient or otherwise determined by the wireless network or call-management server, identifying a person or establishment associated with that location, and then looking up a telephone number associated with the person or establishment.

In a further scenario, the call may be forwarded to a foreign country or to a different geographical region where a different language is spoken. In that case, the appropriate long-distance prefix is automatically added, as needed, to enable the call to be forwarded. The device or any intermediary server may, in this further scenario, launch a real-time speech translation subsystem operable by the user of the device. This speech translation subsystem recognizes words spoken in a first language, translates these into a second language in real-time using a translator (translation software executed by a processor) and then uses a text-to-speech output module to speak or otherwise communicate the translated words in the foreign language to the alternate call recipient. This automatically launched translator may be useful if the call is forwarded abroad to a person who speaks a foreign language. The augmented call identification data 390 displayed in FIG. 12 may also be translated. Optionally, a suitable prefatory statement may be provided in the foreign language to indicate that a real-time digital translator is being used to facilitate the voice communication.

The call-forwarding methods disclosed herein may be used not only to forward a call originating from a mobile device but may also be applied or adapted to forward a call from a landline (PSTN) telephone to a mobile subscriber. This technology may also be applied to forward a VoIP call made using a computer and internet connection to a mobile subscriber.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A computer-implemented method of location-based call forwarding, the method comprising:
   in response to determining by a computing device that an intended call recipient is unavailable to receive a call from a caller, identifying an alternate call recipient who is currently located within a predetermined proximity of a current location of the intended call recipient; and
   forwarding the call to the alternate call recipient.

2. The method as claimed in claim 1 comprising:
   in response to determining that the intended call recipient is unavailable, notifying the caller that the intended call recipient is unavailable;
   notifying the caller that the call is being forwarded to an alternate recipient; and
   notifying the caller of the identity of the alternate call recipient.

3. The method as claimed in claim 1 wherein identifying the alternate call recipient comprises determining a name of a person with whom the intended call recipient is meeting or the name of an establishment where the intended call recipient is located, and then determining a telephone number associated with the person or establishment.

4. The method as claimed in claim 1 wherein identifying the alternate call recipient comprises determining a name of the alternate call recipient from a calendar entry of a calendar associated with the intended call recipient indicating that the intended call recipient is meeting with the alternate call recipient, and then determining a telephone number associated with the alternate call recipient.

5. The method as claimed in claim 1 wherein identifying the alternate call recipient comprises determining a name of an establishment from a calendar entry of a calendar associated with the intended call recipient indicating that the intended call recipient is at an event at the establishment, and then determining a telephone number associated with the establishment.

6. The method as claimed in claim 1 wherein identifying the alternate call recipient comprises determining a current location of the intended recipient from a calendar entry of a calendar associated with the intended recipient, identifying a person or establishment associated with that location, and then looking up a telephone number associated with the person or establishment.

7. The method as claimed in claim 1 wherein identifying the alternate call recipient comprises determining a current location of the intended recipient from a social network check-in status published on a social network site as part of an online personal profile associated with the intended recipient, identifying a person or establishment associated with that location, and then looking up a telephone number associated with the person or establishment.

8. The method as claimed in claim 1 wherein identifying the alternate call recipient comprises determining a current location from location data shared by a mobile device associated with the intended call recipient, identifying a person or establishment associated with that location, and then looking up a telephone number associated with the person or establishment.

9. A computer-readable medium comprising instructions in code which when loaded into a memory and executed by a processor of a wireless communications device cause the device to:
- in response to determining that an intended call recipient is unavailable to receive a call from a caller, identify an alternate call recipient who is currently located within a predetermined proximity of a current location of the intended call recipient; and
- forward the call to the alternate call recipient.

10. The computer-readable medium as claimed in claim 9 comprising:
- in response to determining that the intended call recipient is unavailable, notifying the caller that the intended call recipient is unavailable;
- notifying the caller that the call is being forwarded to an alternate recipient; and
- notifying the caller of the identity of the alternate call recipient.

11. The computer-readable medium as claimed in claim 9 wherein identifying the alternate call recipient comprises determining a name of a person with whom the intended call recipient is meeting or the name of an establishment where the intended call recipient is located, and then determining a telephone number associated with the person or establishment.

12. A computing device comprising:
- a memory coupled to a processor that is configured to determine that an intended call recipient is unavailable to receive a call from a caller,
- wherein the processor is further configured to identify an alternate call recipient who is currently located within a predetermined proximity of a current location of the intended call recipient; and
- wherein the processor is further configured to forward the call to the alternate call recipient.

13. The computing device as claimed in claim 12 wherein the processor is configured to:
- notify the caller that the intended call recipient is unavailable;
- notify the caller that the call is being forwarded to an alternate recipient; and
- notify the caller of the identity of the alternate call recipient.

14. The computing device as claimed in claim 12 wherein the processor is configured to determine a name of a person with whom the intended call recipient is meeting or the name of an establishment where the intended call recipient is located, and then determine a telephone number associated with the person or establishment.

* * * * *